Feb. 27, 1968  W. T. KNAUTH  3,370,807
FISHING REEL BRAKE
Filed Aug. 25, 1965  3 Sheets-Sheet 2
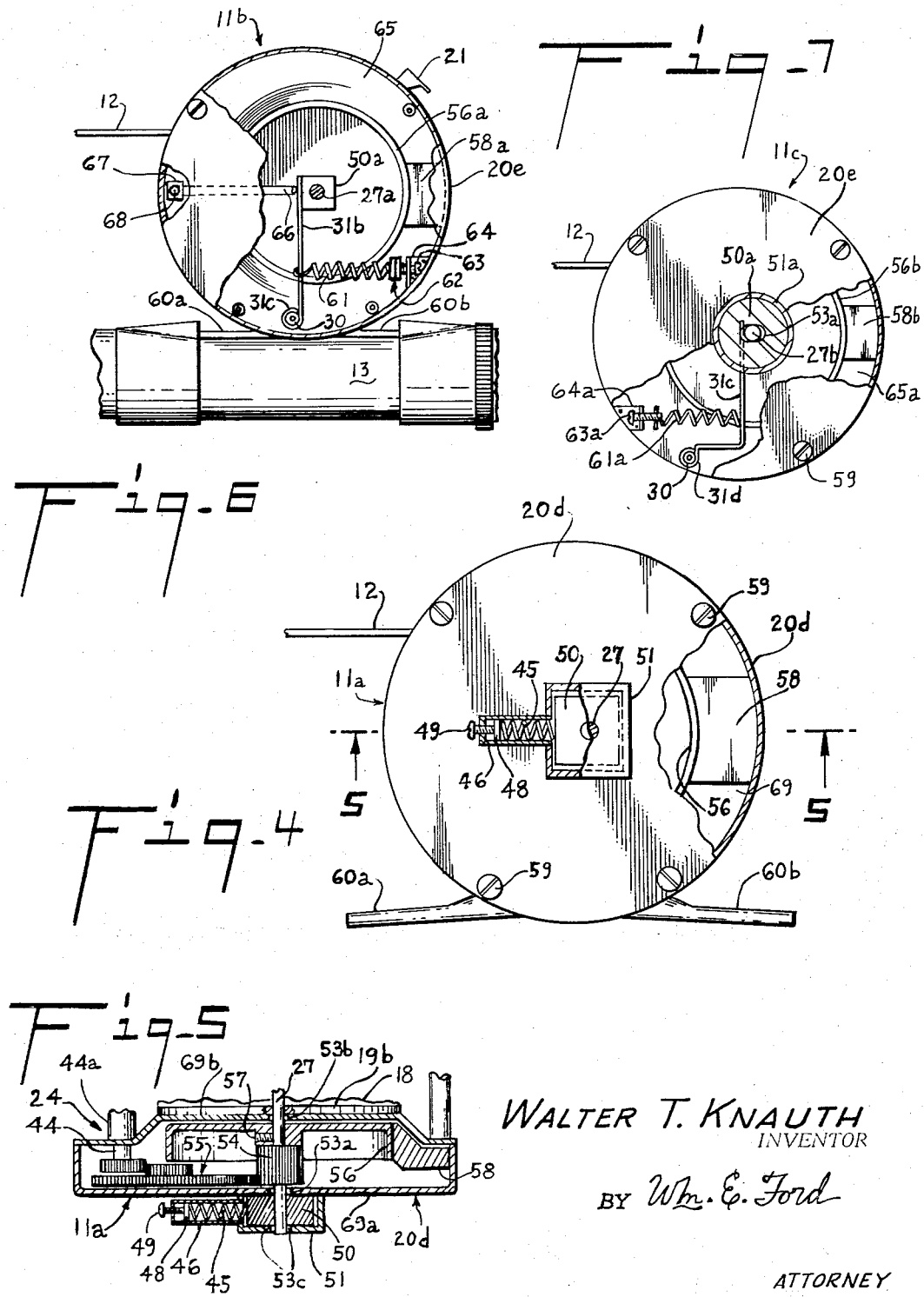
WALTER T. KNAUTH
INVENTOR
BY Wm. E. Ford
ATTORNEY

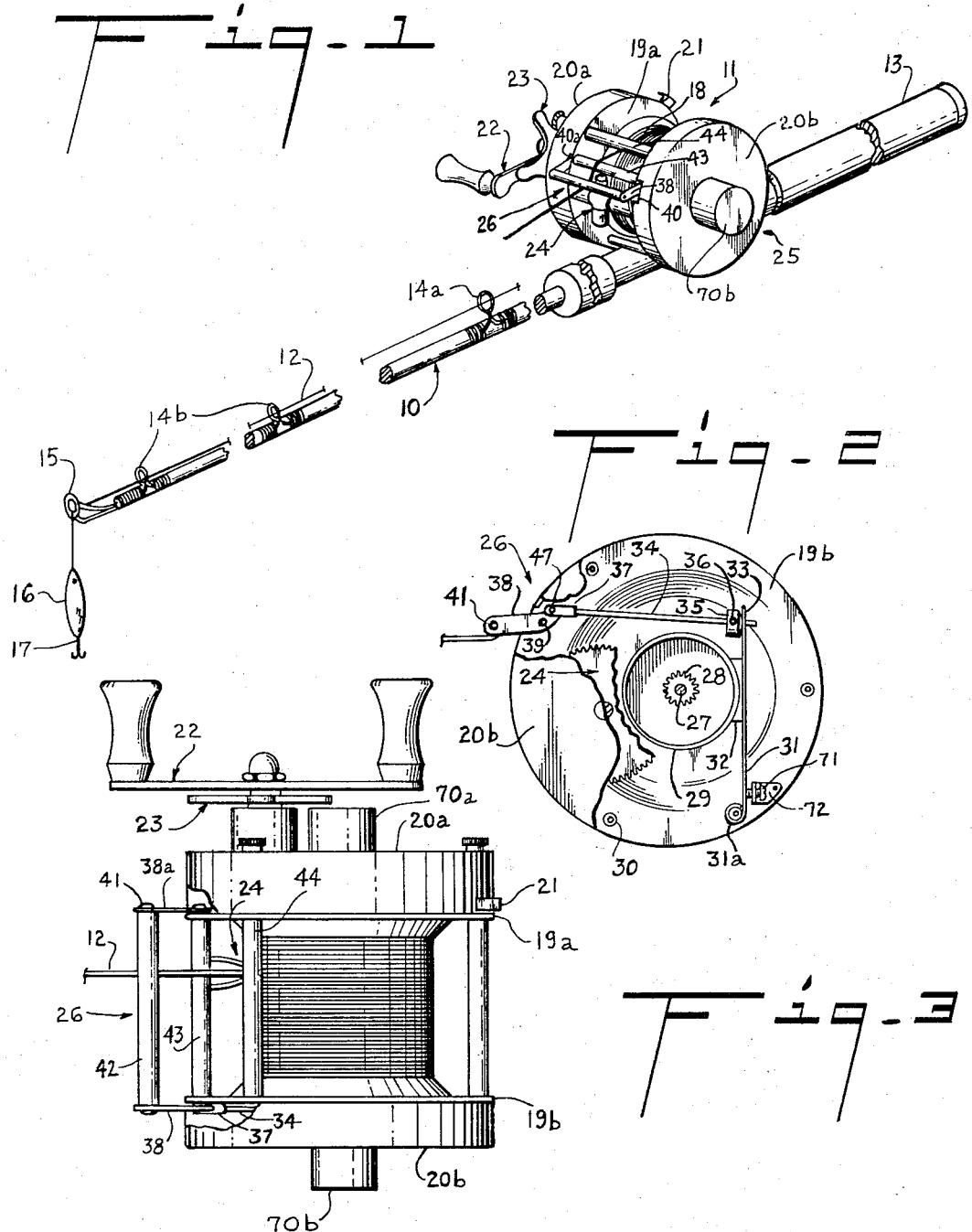

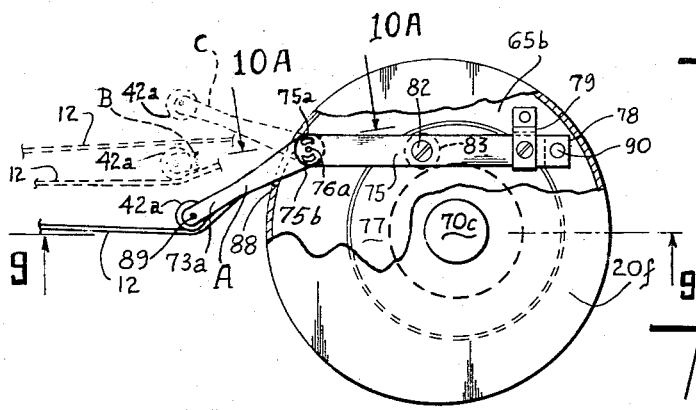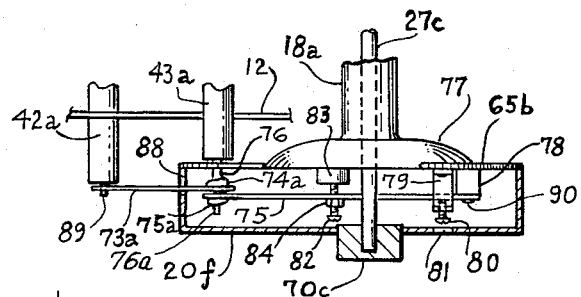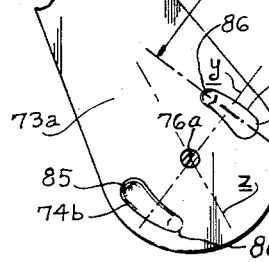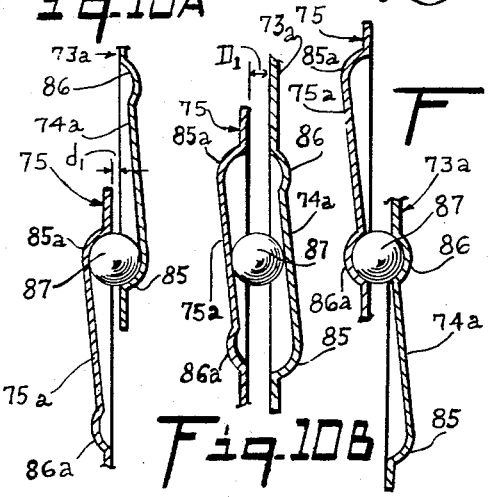
WALTER T. KNAUTH
INVENTOR
BY Wm. E. Ford
ATTORNEY United States Patent Office 3,370,807
Patented Feb. 27, 1968

1

3,370,807
FISHING REEL BRAKE
Walter T. Knauth, 1334 W. Gray, Houston, Tex. 77019
Filed Aug. 25, 1965, Ser. No. 482,434
1 Claim. (Cl. 242—84.52)

ABSTRACT OF THE DISCLOSURE

The invention comprises a fishing reel brake which works against the fishing line being paid out too fast and fouling up on itself due to the excess momentum developed by the reel as a cast is made. In the preferred form developed line friction releases a releasably latched sensing roller yoke to pivot downwardly to a lower, releasably latched position while camming leaf spring means carrying brake shoe means to move said brake shoe means to an axially innermost or fully applied position against reel end face means as the sensing roller yoke is brought to lower, releasably latched position placing greatest bight in the line.

This invention relates to a brake as a brake adapted to be installed on a reel on a fishing pole in manner that the brake is applied with an increasing effect as the differential is increased between the rate at which the line tends to be unreeled, and the rate at which the line travels outwardly as when the cast fishing line may be slowed down in moving outwardly; and conversely, the brake being applied with diminishing effect as the line moves outwardly at a normally fast rate to maintain a relative minimal tension in the line as it is drawn from the reel spool.

When a reel is cast, it often happens that the end of the line, with hook and weight, as a weighted lure thereon passes outwardly at a great rate of speed due to the force with which a cast is made, so that the reel paying out the line turns faster and faster and builds up substantial momentum. Then when the weighted outer part of the line encounters effects that slow down its rate of outward travel, such as, for instance, wind resistance or contact with the water, at such point conventional reels are often turning so fast that the line is being unreeled from the reel at a faster rate than the line tends to travel outwardly, so that this differential thereby created results in the line being unreeled in manner to build up a "backlash" or mass of unreeled line which can require time and patience to unravel. This problem occurs with reels of practically all makes presently serving the trade and a satisfactory solution to this problem has long been sought by anglers.

It is consequently a primary object of this invention to provide, in combination with the fishing reel, a brake which automatically increases its application to the reel spool as the outward passage of the line slows down relative to the rate the line is being unreeled, while conversely, the application of brake to reel spool tends to be reduced the faster the line may be travelling outwardly with relation to the rate at which the spool tends to release the line.

It is also an object of this invention to provide a fishing reel with brake of this class, including a spring urged brake shoe which is moved into braking contact with a brake drum carried on the reel shaft responsive to increase in the differential between the rate at which the line tends to be unreeled and the rate at which the line moves outwardly, as when a cast line encounters resistance and/or slows down.

It is also another and further object of the invention

2 to provide a fishing reel with a brake of this class, in which the reel shaft journal is spring-urged to urge a brake drum carried by the reel shaft against a brake shoe responsive to increase in the differential between the rate at which the line tends to be unreeled and the rate at which the line travels outwardly, as when the line, as cast, tends to encounter resistance and/or slows down.

Also, it is still another object of the invention to provide a fishing reel with brake of this class in which the reel shaft is spring-urged with relation to its journal to move a brake drum carried by the shaft into braking contact with a brake shoe responsive to increase in the differential between the rate at which the line tends to be unreeled and the rate at which the line moves outwardly, as when a cast line encounters resistance and/or tends to slow down.

It is still another and further object of the invention to provide a fishing reel brake of this class which includes means for applying the brake shoe axially against an end of the reel or spool responsive to increase in the differential between the rate at which the line tends to be unreeled and the rate at which the line moves outwardly, as when a cast line encounters resistance and/or tends to slow down.

Also, it is an additional object of this invention to provide a fishing reel brake of this class which includes means of any character which may increase the frictional resistance to reel shaft rotation by any structure or relationship responsive to any tendency of increase in the rate of the paying out of the fishing line from the reel spool relative to the rate the line travels outwardly, as from a casting of the line.

Other and further objects will be apparent when the specification hereinbelow is considered in connection with the drawings, in which:

FIG. 1 is an isometric view of a fishing pole with a reel thereon equipped with a brake comprising one embodiment of the invention;

FIG. 2 is a side elevational view, part in section, showing the left end of the reel shown in FIG. 1 with most of the end cap cut away to show a brake drum on reel shaft engaged by a brake shoe spring urged by a leaf spring mounted on means extending from a reel end flange;

FIG. 3 is a plan view, part in section, of a reel equipped as shown in FIGS. 1 and 2;

FIG. 4 is a side elevational view of the left end of a reel showing another form of the invention, the end cap being shown cut away in one part to show the brake drum and brake shoe; and also being shown cut away in another part to show the shaft journal as being spring-urged by means of a spring mounted on an end cap of the reel;

FIG. 5 is a bottom sectional view, taken along line 5—5 of FIG. 4;

FIG. 6 is a side elevational view showing the left end of a reel on a fragmentary section of a fishing pole, most of the end cap being cut away to show another embodiment of brake in which a brake shoe on the cap is engaged by a brake drum on the reel shaft with the reel shaft journal being shown spring-urged from the reel housing;

FIG. 7 is a side elevational view showing the left end of a reel, with the end cap being cut away in parts to show still another embodiment of brake in which a brake shoe on the cap is engaged by a brake drum on the reel shaft, the shaft being spring-urged from the reel housing and slidable in slots in its journals;

FIG. 8 is a side elevational view, part in section, showing still another embodiment of brake in which a brake shoe is mounted on a cammed leaf spring moved responsive to change in differential between drum rotation tendency and line travel, the brake shoe being applied axially to an end of the line spool or drum;

FIG. 9 is a bottom view, part in section, taken along line 9—9 of FIG. 8;

FIG. 10A, FIG. 10B and FIG. 10C are fragmentary sectional views taken through successive relative positions of cam link and leaf spring as shown in full line view and two successive dotted line views in FIG. 8; the sectional lines along which the view of FIG. 10A is taken being designated as section line 10A—10A in FIG. 8 and also in FIGS. 11 and 12 to be hereinbelow described;

FIG. 11 is an enlarged fragmentary view of the cam end of the leaf spring shown in FIGS. 8–10, inclusive; and FIG. 12 is an enlarged fragmentary view of the cam end of the cam link shown in FIGS. 8–10, inclusive.

Referring in detail to the drawings in which like reference numerals are assigned to the reel parts, pole and fishing line in the various views, a conventional fishing pole 10 is shown in FIG. 1 having a conventional reel 11 mounted on the pole handle 13 with a fishing line or cord 12 paid out from the reel 11 to pass through eyelets 14a, 14b, along the pole, and through an eyelet 15 at the free end of the pole. As shown, the outer end of the line 12 carries a weighted lure 16 in the shape of an artificial small fish or minnow from which the hook 17 is suspended.

The reel 11 shown in the drawings is of the well known type having a spool shaped housing or frame 25 with a reel drum or cylinder 18 in which the line 12 is wound. The frame 25 includes hollow flanges 19a and 19b at either end of the drum or cylinder 18, the flanges 19a and 19b having respective end caps or closure members 20a, 20b mounted thereon, as will be hereinbelow described. A shaft, not shown in FIG. 1, conventionally extends through the reel drum or flanged spool 18 and is journalled in the hubs 70a, 70b of the respective caps 20a, 20b.

The conventional reel 11 includes a clutch, not shown, having a handle or latch bar 21, which extends from the right cap 20a, and which, in the "in" position, disconnects the reel drum or cylinder 18 so that it may rotate freely about the reel shaft, not shown, in FIG. 1, as an axle, with the result that the cylinder 18 is "free-wheeling." In the "out" position, the latch bar 21 connects the reel shaft and the cylinder 18 to rotate together. Thus a take-up and pay-out handle 22, shown in FIG. 1, may be engaged with the shaft and turned appropriately to take up and pay out the line 12, as to "play" a fish which has been caught.

Also, a star wheel 23, shown in FIG. 1, may be turned appropriately to regulate the degree of resistance offered against the rotation of the drum or cylinder 18, the chain of elements through which this is accomplished being well known and the subject matter of separate inventions.

Also, the reel 11 includes a "level-winder" assembly, designated generally by reference numeral 24 in FIGS. 1, 2 and 3, which insures that the fishing line 12 is wound up or paid out evenly, back and forth across the cylinder or reel drum 18.

Having described the background of reel elements in which the brakes comprising this invention are designated to operate, the brakes are now described in detail, with first consideration being given to the mechanism comprising the brake 26 installed upon the reel 11 shown in FIGS. 1–3, inclusive.

The aforesaid reel shaft which passes through the reel drum or cylinder 18, is shown as the shaft 27 in FIG. 2 having a level winder pinion 28 thereon, and inwardly of the level winder pinion 28 a brake drum 29 is rigidly installed upon the shaft 27 to rotate therewith. The cap 20b is connected to the flange 19b by means of internally threaded, hollow studs 30 which extend outwardly from the flange 19b and receive machine screws, not shown, which pass through aligned holes in the cap 20b to be threadably received in the outer ends of the aforesaid studs.

A leaf spring 31 is shown in FIG. 2 as having a loop 31a on one end thereof to fit over a stud 30, the leaf spring 31 being tempered and tensioned to extend chordally across the flange 19b. The leaf spring 31 carries a brake shoe 32 centrally therealong to bear against the brake drum 29 when applied, as will be hereinbelow described. The leaf spring 31 may be adjusted as to the tension with which it urges the brake shoe 32 against the brake drum 29, by means of a setscrew 71 which passes threadably through bracket 72 mounted on the flange 19b.

The free end of the leaf spring 31 is drilled or bifurcated to receive the right end of a linkage 34 therethrough, as shown in FIG. 2, the spring end 33 being disposed and poised to bear in the direction of the shaft 27, or forwardly against a button or bean 35 which is affixed to the linkage 34, as by a small setscrew or pin 36. The left end of the linkage 34 is received in the inner end of a sleeve 37, while the outer end of the sleeve 37 is pivotally mounted on a pin 47 which extends outwardly from the inner end of a toggle lever 38. The toggle lever 38, in turn, is rigidly affixed centrally to the turned-down left end of a shaft 39 which passes through, and is journalled in, the flange 19b, while a brake roller 43, between the flanges 19a, 19b, receives the shaft 39 therethrough, the right end of the shaft 39 being correspondingly turned down and journalled in the flange 19a, and having affixed thereto the inner end of a toggle lever 38a, corresponding with the toggle lever 38, minus the sleeve 37.

The left toggle lever 38 passes outwardly through a slot 40 in the cap 20b and the outer end of this toggle lever 38a which passes outwardly through a slot 40a of a shaft or axle 41 which passes through a brake roller 42. The right end of the shaft or axle 41 is also turned-down and journalled in the outer end of a right toggle lever 38a which passes outwardly through a slot 40a in the cap 19a, and which is drilled correspondingly as the left toggle lever 38. The toggle lever 38a is thus rigidly affixed inwardly to the turned-down outer end of the shaft 39, and outwardly provides the journal for the turned-down right end of the shaft 41.

As can be visualized from a consideration of FIGS. 1 and 2, the slots 40, 40a, in the respective caps 20a, 20b, may serve as stops which limit the clockwise pivoting or upward pivoting of the yoke comprised of the shaft 39 and the toggle levers 38, 38a rigidly affixed thereto, as the toggle levers 38, 38a, can only move clockwise so far without coming into contact with the under surface at the top of the slots 40, 40a.

In operation, when the line 12 is cast with the latch bai 21 pushed inwardly to release the reel cylinder 18, so that it may rotate freely, the line 12 passes rapidly outwardly through the eyelets 14a, 14b, 15, as the weighted lure and hook fly through the air and over the water. As cast, the line 12 passes substantially tangentially outwardly from the outer surface of the line reeled on the drum cylinder 18, and thus it passes under the level winder and spacer roller 44, and over and above the brake roller 43.

The momentum attained by the weighted lure and hook and the hurled line causes the line to extend tautly from the reel drum or cylinder 18 to the eyelet 15, and thence outwardly in the course it follows, as cast, and there is enough force exerted as the line 12 tends to stay taut or in sufficient tension to lift upwardly on the underside of the brake roller 42. In this case the lever 38, and the parallel opposite side lever 38a would appear as having been rotated upwardly or counter-clockwise from the position shown in FIGS. 1 and 2, whereby to relieve the bight or jog in the line 12.

As thus rotated, the lever 38 moves the rod or linkage 34 in direction to move the free end of the leaf spring 31 in manner to reduce the frictional contact between the brake shoe 32 and the brake drum 29, and thus such movement results in the leaf spring 31 moving the brake shoe 32 slightly to the right of the position it is shown occupying in FIG. 2. In practice this movement can be no more than approximately .0005".

As long as there is enough force exerted by the momentum of the cast to cause the line or cord 12 to pass outwardly at a sufficient rate of outward travel relative to the rate at which the line or cord 12 is being unreeled so that a degree of tension is kept in the line as it tends to extend in a straight line or substantially tangentially from the reel to the first eyelet 14a on the pole 10, the line or cord 12 exerts an upwardly acting force against the under surface of the brake roller 42 in opposition to the inherent tension of the leaf spring 31, which, as originally tensioned, tempered, and installed tends to actuate the intervening means between it and the roller 42 in manner that the roller 42 tends to urge downwardly against the cord or line 12.

Conventionally, when the outward movement of the cord 12 beyond the pole 10 encounters increased frictional resistance, while the reel drum 18 can continue rotating with the full force of its momentum, there results a tangled mass of the cord between the reel 11 and the first eyelet 14a on the pole 10. However, with this invention incorporated in the reel, the more the outer part of the cord 12 slows down, opposition to the tendency of the roller 42 to move downwardly is diminished, and thus less and less opposition is offered to the natural bent of the leaf spring 31 to move to the left, as shown in FIG. 2. It follows, in consequence, that more and more of the natural bent of the leaf spring may be employed to move the brake shoe to the left for greater frictional contact with the brake drum, whereby it results that the rate at which the spool or reel drum releases line is automatically restricted and kept in conformity with the rate at which the line slows down in its outward passage. Finally, such braking action can ultimately attain a maximum effect to prevent a backlash when as aforesaid, the spool attempts to release the line at a faster rate than that at which the line travels outwardly.

On occasion it may be desired that the cord or line 12 may pass off the reel drum 18 without restriction to the drum rotation, and in this case it is not necessary to maintain the roller 42 held manually in uppermost position and out of contact with the cord 12. Rather the roller 42 can be continued disposed out of contact if the roller 42 is manually pivoted clockwise above a dead center position, in which the linkage 34 and toggle lever 38 are in axial coextension. Thereafter, the roller 42 could be urged downwardly, as by thumb or finger pressure, to release the toggle action. Also, a means, not shown, may be provided to be operated, as by the latch bar 21, shown in FIG. 1, to bring the toggle effect automatically into and out of service.

As shown in FIGS. 4 and 5, a form of brake is provided which does not require any part of the brake mechanism to be interposed outwardly of, or axially parallel with the spool or reel drum 18, but instead the spool is moved opposite the direction of cord travel responsive to the urging of a spring 45 in opposition to the force of the cast. In this form of the invention, the reel shaft 27 is shown journalled in a journal block 50, of square or rectilinear cross-section, which is received into a hollow, four-sided hub 51 which is affixed to the outer plate of the left reel cap 20d.

A spring 45 is housed in a cylinder 46 which is connected into the hollow hub 51, the outer end of the spring bearing against a disc 48 within the hub, and an adjustment screw 49 in turn extending threadably through the outer end of the cylinder 46 whereby the tension with which the spring 45 bears against the journal block 50 may be adjusted.

The shaft 27 extends inwardly through an oversize bore or slot 53a in the cap 20d, and within the cap the shaft 27 carries a pinion 54 thereon which normally loosely meshes with the inner transmission member of a gear transmission 55 which drives the level winder shaft 44 which extends through a spacer and cover tube 44a which carries the level winder. Also the shaft 27, which carries the brake drum 56, passes with clearance through an oversize bore or slot 53b in the reel frame flange 19b.

A brake drum 56 is rigidly fixed to the reel drum shaft 27 by a setscrew 57, as best shown in the sectional bottom view of FIG. 5; the brake drum 56 being of such diameter in relation to the transverse dimension of the hub 51 and in relation to the clearance provided for the shaft 27 by an oversize bore or slot 53a in the outer plate 69a of the cap 20d, and in relation to the clearance provided for the shaft 27 by an oversize bore or slot 53b in the inner plate 69b of the cap 20d, that the brake drum 56 establishes contact with a brake shoe 58 carried rigidly by the cap 20d while the right side of the journal block 50, also moved to the right, is still clear of the inside right wall of the hollow hub 51; these relationships being easily visualized by a consideration of FIG. 4 in connection with FIG. 5. Also, in this regard, the hollow hub 51 has an oversize bore or slot 53c therein to permit transverse movement of the shaft 27.

It can thus be appreciated that this form of the invention counterpoises the rate of reel drum rotation against the rate at which the cord or line 12 moves outwardly, as by a cast, in manner that, when the cord moves outwardly with enough impulse to maintain the cord 12 extending substantially straight or tautly as it is drawn off the rotating reel drum 18, then the cord can pull the reel drum to the left so that the journal block 50 is urged against the tension of the spring 45 to compress it, whereby the brake drum 56 is rotated with clearance with relation to the brake shoe 58.

The structure of the reel 11a otherwise corresponds with the construction of the reel hereinabove described with relation to FIGS. 1–3, inclusive. Thus, the cap 20d is shown connected by machine screws 59 which are threaded into hollow studs, not shown in FIGS. 4 and 5, but which extend outwardly from the inner plate 69. The reel 11a also includes the conventional oppositely extending side rods or lugs 60a, 60b by which the reel is connected to the fishing pole, not shown.

An embodiment of the invention is shown in FIG. 6, which operates on a related theory, and in this case a journal block 50a having an end of the reel shaft 27a journalled therein, is shown mounted upon a stiff arm 31b which terminates outwardly in a loop 31c extending around a hollow stud 30; the stud also serving as a connection member to receive a machine screw threaded thereinto as a connection element between the cap 20c and the reel flange 65 from which the hollow stud extends outwardly.

In this form of the invention a brake shoe 58a is shown carried by a cap 20e of the reel 11b, or optionally it may upstand from, and be carried by the flange 65. In any event, such will be rigid in assembly with relation to flange and/or cap whereas the brake drum 56a which is mounted on, and rotated with the shaft 27a, can move substantially in small degree, as say .0005" with relation to the fixed brake shoe 58a. A stop against leftward movement, in the relationships of FIG. 6, is provided in the form of a rod 66 which terminates outwardly in a head 67, a rivet 68 passing through the head 67 to fixedly position the rod 66 with relation to the reel flange 65.

In FIG. 6 a coil spring 61 is connected at its inner end to the arm 31b intermediate between the journal block 50a and the loop 31c while the outer end of the coil spring 61 is connected to the inner race of a swivel 62 shown diagrammatically in FIG. 6. The outer race of the swivel 62 is indicated as having the inner end of an adjustment screw 63 connected thereto; the shank of the adjustment screw 63 passing threadably through a bracket 64 which is connected to the reel flange 65.

In this embodiment the force of the cast, in process of pulling the line 12 from the reel drum, is employed directly as a tendency tending to draw the reel drum and thus the brake drum on the reel shaft, away from the brake shoe, or to the left, in opposition to the rightward urging of the spring 61. Conversely when the reel drum or spool tends, by its momentum, to unreel the line 12 in manner that an increased differential tends to be produced with relation to the rate at which the line travels outwardly, the line 12 then tends to lose tension, and the urging of the spring 61 can then draw the brake drum 56a relatively to the right to increase braking action.

Another embodiment of the invention is shown in FIG. 7, which operates on principles very related to those on which the embodiment shown in FIG. 6 operates. In this embodiment a journal 50a, as for the left end of a reel 11c, fits into the hollow hub 51a of the left reel cap 20c, and an oblong slot 53a, with major axis transverse to the vertical, and with minor axis of dimension to slidably receive the end of the reel drum shaft 27b, is provided in the journal 50a to receive the left end of the aforesaid reel drum shaft 27b slidably therein. A brake drum 56b is mounted on the shaft 27b, and affixed thereto to rotate therewith, while a brake shoe 58b is affixed to the cap 20e, or optionally to the reel drum flange 65a, to upstand or extend outwardly therefrom.

In this embodiment of the invention a coil spring 61a, of the compression type, is rigidly connected at one end to an adjustment screw 63a which is threadably disposed through a bracket 64a, which is riveted to, or otherwise affixed to, a reel end flange 65a of a reel 11c, so that the bracket 64a extends longitudinally outwardly, or upstands from the aforesaid reel flange 65a. At its inner end the coil spring 61a bears against an arm 31c which is pivoted at one end 31d about a hollow stud 30, the hollow stud 30 also serving, as aforesaid, as a connection member whereby to receive a machine screw 59 threadably thereinto, the machine screw 59 comprising one of the several machine screws which connect the cap 20e to the reel flange 65a.

The free end of the arm 31c, inwardly of the spring 61a, bears against the shaft 27b and the spring 61a urges the arm 31c to the right as shown in FIG. 7. Thus, the spring 61a urges braking contact between the drum 56b and the shoe 58b when the reel 11c is employed to cast the line 12. In such case, the force of the cast, in the process of pulling the line 12 from the reel drum, is employed directly as a factor tending to draw the reel drum, and thus the brake drum 56b on the reel shaft 27b, away from the brake shoe 58b or to the left with relation to the rightward urging of the spring 61a. Conversely, when the reel drum or spool 10, by its momentum, unreels the line 12 in manner that an increased differential tends to be produced with relation to the rate at which the line 12 travels outwardly, the line 12 then tends to lose tension. Thus, this embodiment of the invention operates correspondingly in function with the embodiment shown in FIG. 6, as its spring 61a urges its brake drum shaft 27b to slide to the right in the journal slot 53a thereby carrying the bake drum 56b relatively to the right and into increased frictional contact with the brake shoe 58b to increase braking action.

Another embodiment of the invention is shown in FIGS. 8–12, inclusive, the invention including as part thereof rollers corresponding with the rollers 42 and 43 shown in FIGS. 1 and 2. Otherwise, this embodiment of the invention brakes the unreeling of the line by applying a brake shoe element axially against a reel spool flange.

In detail, an upper or guide roller 43a is best shown in FIG. 9, forwardly of, and parallel to, the reel drum or spool 18a, and a shaft 76 is passed therethrough about which the roller 43a revolves, the ends of the shaft 76 being journalled in the opposed end plates or inner flanges of the reel end housings carried by the reel. Thus, as shown in FIGS. 8 and 9, the left reel end housing is comprised of an end plate or inner flange 65b, on which a left reel cap 20f is peripherally mounted and connected thereto by conventional means, not shown. As shown in FIG. 9 the flange 65b is annular, and the left spool end flange 77 may revolve therewithin with slight clearance.

The left end of the shaft 76 is rigidly connected to the cam lever 73a on the left side of the reel, and the right end thereof is rigidly connected to an opposed lever on the right side of the reel, not shown. The shaft end 65b is of reduced diameter outwardly, and extends with slight clearance through the cam bar 75, and outwardly therefrom into the interior of the cap 20f. As shown in FIGS. 8 and 9, the cam lever 73a extends outwardly through a slot 88 in the cap 20f and has the end of a roller shaft 88 rigidly connected thereto, the other end of the roller shaft 89 being correspondingly rigidly connected to a lever, not shown, which is pivotally mounted on a pivot extending from the reel flange, not shown, on the opposite end of the reel from the reel flange 75b.

The aforesaid lever thus passes outwardly from its pivot through a slot in the right end cap of the reel, corresponding with the slot 40a shown in FIG. 1, and has the other end of the roller shaft 89 passed therethrough, and rigidly affixed thereto, as aforesaid. Thus, the lever, roller shaft 89 and cam lever 73a together form a yoke which supports the brake roller 42a between cam lever and lever outer ends to extend concentrically around its roller shaft or axle 89, while the aforesaid yoke pivots about the roller shaft 76.

The cam bar 75 has its inner or right end mounted on a support or post 78 which extends outwardly from the reel end plate or flange 65b, and a conventional means, as a pin or rivet 90 connects together the cam bar 75, the post 78, and the flange 65b. Adjacent the post 78, a bracket 79 may be provided and supported from the plate or flange 65b, a screw 80 being threadable through the outer leg of the bracket 79 so that its inner end may be adjustably positioned adjacent the cam bar 75 to adjust the tension offered by the cam bar 75. In order to permit easy adjustment of the said screw 80 from the exterior, a small bore 81 may be provided in the outer face of the cap 20f.

A brake screw 82 is threadable through the bar 75 at a distance intermediate its ends, and the inner end of such brake screw 82 has affixed thereto a brake shoe 83 of cylindrical shape so that the inner face or end of the brake shoe 83 may bear in braking contact against the outer face of the spool end 77 of the reel drum 18a. An adjustment nut 84 is provided and fixed to the cam bar 75 through which the screw 82 passes, such nut 84 being of the self-locking type whereby the screw 82 will remain in adjusted position. For service, an access hole, not shown, may be provided in the cap 20f corresponding with the hole 81 shown outwardly of the screw 80 in FIG. 9.

The cam bar 75, shown in FIGS. 8 and 9, with left end shown in detail in FIGS. 10A, 10B, 10C and 11, has cammed indentations 75a and 75b on its left end with the indentation 75a above the shaft end 76 having the largest recess space 85a to the left, while the recess diminishes in depth toward the right to terminate in a latching recess 86a shaped as a small segment of a sphere. On the lower side of the shaft end 76, the cam bar indentation 75b has the largest recess space to the right while the recess diminishes in depth toward the left to terminate in a small latching recess 86a shaped as a small segment of a sphere.

The cam lever 73a, shown in FIGS. 8 and 9, with right end shown in detail in FIGS. 10 and 11, has cammed indentations 74a and 74b on its right end with the indentation 74a above the shaft end 76 having the largest recess space 85 to the right, while the recess diminishes in depth toward the left to terminate in a latching recess 86 shaped as a small segment of a sphere. On the lower side of the shaft end 76, the cam lever indentation 74b, has the largest recess space 85 to the left while the recess diminishes in depth toward the right to terminate in a latching recess shaped correspondingly as the recess 86.

In regard to the disposition of the cam bar indentations 75a and 75b, as shown in FIG. 11, a line $w$ centrally through these and passing through the center of the shaft 76 is substantially perpendicular to the longitudinal axis $x$ of cam bar 75, while a line $y$ centrally through the indentation 74a, 74b shown in FIG. 12, and passing through the shaft 76 is at an angle of less than 90 degrees, or approximately 60 degrees, to the longitudinal axis $z$ of the cam lever 73a.

In practice, when the reel is cast, the force of the cast and the differential between the rate the line 12 passes outwardly and the rate at which the reel drum 18 tends to rotate in building up momentum results in the line 12 bearing upwardly with a degree of tension on the underside of the roller 42a. Thus, in the dotted line, intermediate position of the roller 42a shown in FIG. 8, the line 12 tends to pass outwardly almost tangentially from the reel drum and thus in an approach to straight line direction between the outer surface of line on the reel and the adjacent eyelet on the pole, not shown.

In this case, as shown in FIG. 10B, a ball or sphere 87 will be disposed between the opposed indentations 74a, 75a in manner that the cam bar 75 is lifted to a spaced distance $D_1$ from the cam lever 73a. As the cam lever 73a is not disposed to be moved axially, the result is that the cam bar 75 is lifted or urged outwardly at its free end so that the brake shoe 83 is lifted thereby to diminish, or to relieve the braking contact against the outer face of the reel spool flange 77.

On the other hand, when the outward travel of the line 12 slows down relative to the rate at which the momentum of the reel drum or cylinder 18a tends to unreel line 12, the tension that the line 12 maintains upwardly against the undersurface of the brake roller 42a diminishes, and thereby the free end of the leaf spring cam bar 75 can teeter relatively axially inwardly, whereby the sphere or ball 87 takes position shown in FIG. 10A, and is disposed in the deepest parts 85, 85a of the respective indentations 74a, 75a, and correspondingly a sphere or ball therebelow, on the opposite side of the shaft end 76, becomes disposed in the deepest parts of the respective indentations 74b, 75b.

When the relationships shown in FIG. 10A are attained, the lever 73a occupies the full line position shown in FIG. 8, and thus the cam bar 75 has moved axially in direction of the cam lever 73a, from the spaced apart position of cam bar 75 and lever 73a shown in FIG. 10B. Consequently, the adjustment screw 82, locked to the cam bar 75, has moved proportionally toward the right, or axially inwardly as shown in FIG. 9, to apply with force, or to increase the braking contact between the outer face of the reel or spool end flange 77 and the inner face of the brake shoe 83 which is carried by the adjustment screw 82.

In this lowermost position of the cam lever 73a, and consequently the lowermost position of the lever opposite thereto, the yoke which includes the brake roller 42a is pivoted downwardly to place the greatest bight in the line 12, while coincidentally therewith in point of time, the brake shoe 83 is urged with greatest braking effect against the outer face of the spool end or flange 77.

Thus the tendency of the reel or spool 18a to unreel the line 12 at a faster rate than the line 12 travels outwardly, as when the impact or force of a cast begins to expend itself and/or the line 12 begins to encounter resistance slowing down its outward travel, is immediately counter-balanced, and in proportionate degree, by the free end of the cam bar 75 moving axially inwardly. Consequently, the embodiment of the invention shown in FIGS. 8-12, inclusive, operates in principle correspondingly as the aforesaid embodiments of the invention shown in FIGS. 1-7, inclusive, except that the braking force is applied axially against the reel spool end or reel flange, rather than relatively radially between a brake drum and brake shoe.

In the event it may be desired to dispense with the operation of the automatic braking of the reel, as aforesaid, the sensing roller 42a, or a part or parts of the yoke which supports it, may be manually contacted and pivoted upwardly about the shaft end pivot means 76 to dispose the sensing roller 42a in the uppermost dotted line position shown in FIG. 8. In this case, as shown in FIG. 10C a sphere or ball 87 is shown in the ends of the opposed upper indentations 74a, 75a, which have the respective opposed latching recesses 86, 86a, therein, while the opposed lower indentations 74b, 75b, as shown in FIGS. 12 and 11, respectively, would have a sphere or ball, not shown, in the respective opposed latching recesses 86, 86a.

In this position, the yoke including the cam lever 73a is toggle latched, with relation to the cam bar 75, as the free end of the cam bar 75 is urged outwardly so that the brake shoe 83 is latched out of contact with the reel spool end or flange 77.

The toggle latching of the roller 42a in an uppermost position is an expedient or added feature which can be incorporated and employed, as when it may be desirable to change the line 12, or under a variety of diverse alternatives and emergencies. In any case, the application of the toggle latch may be readily unlatched and the brake action put back into effect, simply by manually pressing downwardly on the yoke including the roller 42a, with enough force to free the balls 87 from their releasable entrapment between the recesses 86, 86a.

In reiteration, when the cam lever 73a and cam bar 75 are disposed as shown in FIG. 10A, corresponding with the full line or position of the cam lever 73a shown in FIG. 8, the upper and lower balls or spheres 87 are in the respective deepest recesses 85 and 85a, whereby only the minute distance $d_1$ separates the cam bar and cam lever. In FIG. 10B the cam lever 73a and cam bar 75 are spaced apart an ample distance $D_1$, as to actuate the brake, the balls 87 being shown as having rolled approximately half way up an inclined plane in the opposed recesses of both cam bar and cam lever, and in this way the cam bar end has been spread apart from the cam lever. In FIG. 10C the balls or spheres 7 have rolled past the points of minimum depression and dropped latchably into the holding depressions or recesses 86, 86a.

In the embodiment of FIGS. 1-3, inclusive, and in the embodiment of FIGS. 8-12, inclusive, where rollers parallel to the reel axis are employed, there would be no necessity to have a brake drum-brake shoe arrangement on both sides of the reel. However, for purposes of balance, in the embodiments shown in FIGS. 4 and 5, in FIG. 6 and in FIG. 7, it may be desirable to have similar braking arrangements on both ends of the reel.

As may be appreciated from the various embodiments hereinabove disclosed, the invention may employ various other embodiments and structural arrangements to carry out the theory thereof. Consequently, the invention is not limited to the particular structures and combinations of elements hereinabove disclosed, but other embodiments, modifications, structural arrangements and disclosures are considered as well as such may fall within the broad spirit of the invention and within the broad scope of interpretation claimed for, and merited by, the appended claim.

What is claimed is:

1. A fishing reel brake responsive to the tension of the fishing line and comprising, a reel frame including spaced apart end caps, a flange spool rotatably mounted between said end caps with the fishing line extending forwardly from said spool, a cammed bar having one end portion mounted on one of said end caps and having an opposite end portion and an intermediate brake portion free to move axially into engagement with an adjacent flange of said spool, a roller having an axle extending between, and mounted at its opposite ends, in said end caps parallel to said spool, a yoke having arms pivotally carried at their free ends by the opposite ends of said roller axle, the bight portion of said yoke including a roller engaging said fishing line as it extends from said spool and assuming a position in response to tension in said fishing line, co-operating cam means on the free end portion of one of said yoke arms and said opposite end portion of cam bar arranged to axially move said cam bar and brake carried thereby in response to the position of said yoke as determined by the tension in said line during casting.

References Cited

UNITED STATES PATENTS

| | | | |
|---|---|---|---|
| 798,701 | 9/1905 | Rabbeth | 242—84.52 |
| 1,434,626 | 11/1922 | Parks | 242—84.54 |
| 1,864,900 | 6/1932 | Gaddine | 242—84.44 |
| 2,637,507 | 5/1953 | Phillips | 242—84.52 |
| 2,715,503 | 8/1955 | Wegner | 242—84.52 |
| 2,853,252 | 9/1958 | Thiel | 242—84.52 |

FOREIGN PATENTS 447,510  5/1933  Great Britain.

BILLY S. TAYLOR, *Primary Examiner.*